United States Patent
Sekine et al.

(10) Patent No.: US 11,577,216 B2
(45) Date of Patent: Feb. 14, 2023

(54) CARBONATE APATITE WITH HIGH CARBONATE CONTENT

(71) Applicant: JAPAN ATOMIC ENERGY AGENCY, Ibaraki (JP)

(72) Inventors: Yurina Sekine, Ibaraki (JP); Takuya Nankawa, Ibaraki (JP); Naofumi Kozai, Ibaraki (JP)

(73) Assignee: JAPAN ATOMIC ENERGY AGENCY, Ibaraki (JP)

( * ) Notice: Subject to any disclaimer, the term of this patent is extended or adjusted under 35 U.S.C. 154(b) by 355 days.

(21) Appl. No.: 16/731,234

(22) Filed: Dec. 31, 2019

(65) Prior Publication Data

US 2020/0215513 A1    Jul. 9, 2020

(30) Foreign Application Priority Data

Jan. 9, 2019  (JP) ................ JP2019-002040

(51) Int. Cl.
*B01J 20/04* (2006.01)
*C01B 25/16* (2006.01)

(52) U.S. Cl.
CPC ............. *B01J 20/048* (2013.01); *C01B 25/16* (2013.01); *C01P 2002/70* (2013.01); *C01P 2002/82* (2013.01); *C01P 2004/04* (2013.01); *C01P 2004/61* (2013.01); *C01P 2004/62* (2013.01)

(58) Field of Classification Search
CPC ..... B01J 20/048; B01J 20/0277; C01B 25/16; C01P 2002/70; C01P 2002/82; C01P 2004/04; C01P 2004/61; C01P 2004/62; A61L 27/12; A61L 27/50; A61L 2430/02
See application file for complete search history.

(56) References Cited

U.S. PATENT DOCUMENTS

| | | | |
|---|---|---|---|
| 4,917,702 A | 4/1990 | Scheicher et al. | |
| 2007/0082062 A1* | 4/2007 | LeGeros ............. | A61K 33/16 424/602 |
| 2007/0218098 A1* | 9/2007 | Reif .................. | A61L 27/56 424/423 |
| 2009/0068285 A1* | 3/2009 | LeGeros ............. | A61K 33/42 424/641 |

(Continued)

FOREIGN PATENT DOCUMENTS

| | | |
|---|---|---|
| CN | 1799643 | 7/2006 |
| CN | 105712737 | 6/2016 |

(Continued)

OTHER PUBLICATIONS

Mayer et al., "Magnesium-Containing Carbonate Apatites," Journal of Inorganic Biochemistry, vol. 66, 1, Apr. 1997, 1-6. (Year: 1997).*

(Continued)

*Primary Examiner* — Anthony J Zimmer
(74) *Attorney, Agent, or Firm* — Wenderoth, Lind & Ponack, L.L.P.

(57) ABSTRACT

A carbonate apatite highly containing carbonate groups, having excellent heavy metal adsorption capacity is provided. The carbonate apatite contains not less than 15.6% by weight carbonate groups, preferably contains at least one of copper (Cu), zinc (Zn), strontium (Sr), magnesium (Mg), potassium (K), iron (Fe), and sodium (Na), and preferably has a Ca/P molar ratio of not less than 1.5.

8 Claims, 6 Drawing Sheets

(56) References Cited

U.S. PATENT DOCUMENTS

2013/0084228 A1* 4/2013 Li .......................... C01B 25/16
423/175
2015/0250921 A1* 9/2015 Li .......................... A61L 27/56
424/602

FOREIGN PATENT DOCUMENTS

| DE | 28 40 064 | | 3/1980 |
|---|---|---|---|
| JP | 62-500153 | | 1/1987 |
| JP | 2005-126335 | | 5/2005 |
| JP | 2015-084814 | | 5/2015 |
| JP | 2015086081 A | * | 5/2015 |
| JP | 2015086082 A | * | 5/2015 |

OTHER PUBLICATIONS

Miyake et al., "Synthetic Carbonate Apatites as Inorganic Cation Exchangers," J. Chem. Soc. Faraday Trans., 1990, 86(12), 2303-2306. (Year: 1990).*

First Office Action dated Aug. 10, 2022 in corresponding Chinese Patent Application No. 202010019261.3, with English language translation.

Notice of Reasons for Refusal dated Nov. 29, 2022, in corresponding Japanese Patent Application No. 2019-002040, with English translation.

Takashi Suzuki, "Modified Apatites and Their Feasibility as Removal Agents for Toxic Ions in Polluted Water", Bulletin of the Society of SeaWater Science, Japan, vol. 44, No. 3, pp. 159-166, 1990, with partial English translation.

* cited by examiner

CARBONATE APATITE WITH HIGH CARBONATE CONTENT

BACKGROUND OF THE INVENTION

Field of the Invention

The present invention relates to a carbonate apatite highly containing carbonate groups, which carbonate apatite can be suitably used as a metal adsorbent or the like, and uses thereof.

Description of the Related Art

Since apatite compounds have good affinity for living organisms, there have been a large number of studies on their synthesis methods and physical properties aiming at their utilization as materials of artificial bones, drug delivery carriers, and the like. Moreover, since they are adsorptive also to hazardous metals, their use as adsorption materials has also been proposed. However, their adsorption capacities and ion selectivities still remain to be improved.

Patent Document 1 discloses a carbonate-containing calcium phosphate containing 1% by weight to 15% by weight carbonate groups. However, since it is prepared by mixing supersaturated calcium phosphate solution with a carbonate liquid, the carbonate-group introduction rate has been insufficient.

PRIOR ART DOCUMENT

Patent Document

[Patent Document 1] JP 2005-126335 A

SUMMARY OF THE INVENTION

One aspect of the present invention is to provide a carbonate apatite highly containing carbonate groups, which carbonate apatite can be suitably used as a metal adsorbent or the like.

The present inventors discovered that a carbonate apatite compound highly containing carbonate groups, which compound has excellent metal ion selectivity and adsorption capacity, can be obtained by carrying out a calcination step and a basic carbonate compound reaction step utilizing livestock bone. In other words, the present inventors successfully produced a carbonate apatite highly containing carbonate groups.

The present invention provides the followings.
[1] A carbonate apatite comprising not less than 15.6% by weight carbonate groups.
[2] The carbonate apatite according to [1], comprising not less than 16.0% by weight carbonate groups.
[3] The carbonate apatite according to [1] or [2], having a Ca/P molar ratio of not less than 1.5.
[4] The carbonate apatite according to any one of [1] to [3], containing at least one of copper (Cu), zinc (Zn), strontium (Sr), magnesium (Mg), potassium (K), iron (Fe), and sodium (Na).
[5] The carbonate apatite according to any one of [1] to [4], containing a crystal structure having an average crystallite size of 1 to 100 nm.
[6] The carbonate apatite according to any one of [1] to [5], which is a bulk body.
[7] The carbonate apatite according to any one of [1] to [5], which is in a powder form having an average particle size of 10 μm to 500 μm.
[8] The carbonate apatite according to any one of [1] to [7], which is prepared from animal bone.
[9] A method of adsorbing a metal comprising contacting a solution containing a metal with the carbonate apatite according to any one of [1] to [8].
[10] The method according to [9], wherein said metal is at least one metal selected from the group consisting of cadmium, strontium, cobalt, copper, lead, manganese, nickel, magnesium, mercury, arsenic, aluminum, tin, beryllium, and uranium.

According to the present invention, a novel apatite-based compound highly containing a carbonic acid salt can be provided. The carbonate apatite of the present invention exhibits high selectivity and high adsorption capacity for cadmium, strontium, cobalt, copper, lead, manganese, nickel, uranium, and the like. In particular, in Examples, the carbonate apatite of the present invention was found to exhibit a Kd value of about 150,000 mL/g for strontium. Widely used zeolites and raw bones have Kd values of about 3000 mL/g, and conventional synthetic apatites have Kd values of about 10,000 mL/g. Thus, the carbonate apatite of the present invention can be said to have extremely high adsorption capacity. This was thought to be due to, for example, the fact that the crystallites constituting the apatite are small, and the fact that carbonate groups provide stable adsorption sites. The carbonate apatite of the present invention may contain a metal such as copper, zinc, strontium, magnesium, potassium, iron, or sodium, which might change the charge state or cause a defect in the crystal lattice, leading to production of an advantageous effect on the adsorption.

Uses of the carbonate apatite of the present invention are not limited, and the carbonate apatite may be used as a material of, for example, an artificial bone or a drug delivery carrier. Examples of especially preferred uses thereof include materials for adsorption and removal of radioactive metals, and materials for adsorption and removal of hazardous metals, which materials are applicable to contaminated soils, contaminated waters, sea waters, soils of abandoned mines, and the like.

The carbonate apatite of the present invention can be used also as an adsorbent for alizarin red, formaldehyde, protein, and organic matter such as viruses and bacteria including *E. coli*.

DETAILED DESCRIPTION OF THE INVENTION

<Carbonate Apatite of Present Invention>

Figure 1:
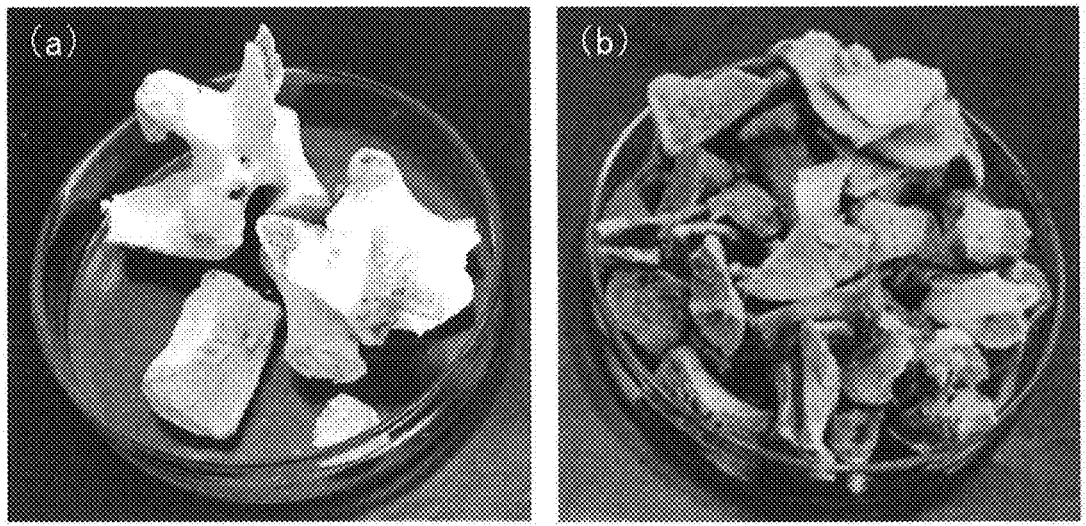
FIG. 1 shows photographs of bone samples before (a) and after (b) basic carbonate compound treatment.

The carbonate apatite of the present invention comprises not less than 15.6% by weight carbonate groups.

The content of carbonate groups is preferably not less than 16.0% by weight. There is no upper limit of the content, and it may be, for example, 30.0% by weight or 25% by weight. The content of carbonate groups can be quantified by comparing the absorption intensity of the absorption band of carbonate groups that appears at 1400 to 1550 $cm^{-1}$ in the infrared absorption spectrum, with that of a carbonate-containing calcium phosphate having a known carbonate content.

The carbonate apatite of the present invention has a composition of an apatite compound containing as major components calcium, phosphate groups, and hydroxyl groups, wherein part of the phosphate groups and/or the hydroxyl groups are substituted by carbonate groups.

The carbonate apatite of the present invention has a Ca/P molar ratio of, for example, not less than 1.5. The Ca/P molar ratio may also be not less than 1.7. There is no upper limit of the Ca/P molar ratio, and it may be, for example, 1.74. The Ca/P molar ratio can be measured by, for example, ICP emission spectrochemical analysis.

The carbonate apatite of the present invention preferably contains a metal other than calcium, such as copper, zinc, strontium, magnesium, potassium, iron, or sodium. Regarding the contents of these metals, for example, the content of each metal may be 0.01 to 1.0% by weight, and their total content may be 0.5 to 5% by weight as calculated with respect to the carbonate apatite's total weight of 100%. The contents of these metals can be measured by X-ray fluorescence analysis or the like.

The carbonate apatite of the present invention may have a zeta potential of not more than −15 mV. By this, a better metal adsorption capacity can be produced.

The carbonate apatite of the present invention may be a compound containing a crystal structure. In such a case, regarding the size of the crystallites as the minimum units constituting the crystal, the crystal obtained may have an average crystallite size of about 1 to 100 nm, which is smaller than conventional sizes. The crystallite size can be measured by transmission electron microscopy or X-ray diffraction analysis.

The carbonate apatite obtained by the method of the present invention may be either a bulk body or a powder. Examples of the powder include powders having an average particle size of 10 μm to 500 μm. The average particle size can be measured by microscopy, sieving, or the light scattering method.

<One Example of Production Method for Carbonate Apatite of Present Invention>

The carbonate apatite of the present invention can be obtained by the following method using bone of livestock or the like such as cow, pig, or bird as a raw material. However, the carbonate apatite of the present invention is not limited to those obtained with the following materials or by the following method.

The carbonate apatite can be prepared by performing a step of subjecting livestock bone to calcination treatment at high temperature under high pressure and then removing bone marrow ($1^{st}$ Step), a step of reacting a basic carbonate compound ($2^{nd}$ Step), and, when necessary, a step of drying and pulverization to control the particle size ($3^{rd}$ Step).

More specifically, in the $1^{st}$ Step, the calcination is preferably carried out within a temperature range from 100 to 200° C., preferably from 120 to 150° C., and a pressure range from atmospheric pressure to 3 atm, especially preferably at a pressure of about 2 atm. The calcination time is not limited, and may be appropriately controlled according to the treated amount and/or the like. The calcination time is, for example, 0.5 to 5 hours. Since bone marrow is detached from the bone by this treatment, the bone marrow can be easily manually removed.

Subsequently, the $2^{nd}$ Step is carried out. This step is carried out for two purposes: removal of organic matter from the bone, and carbonate group modification. The bone calcination product may be reacted with the basic carbonate compound in a liquid such as water. The reaction temperature is preferably within the range of 30 to 90° C., especially preferably 40 to 60° C. The salt added is not limited as long as it is a carbonic acid salt. Examples of the salt include $NaHCO_3$, $Na_2CO_3$, $K_2CO_3$, $KHCO_3$, $CaCO_3$, $MgCO_3$, $Li_2CO_3$, and $(NH_4)_2CO_3$. Among these, $NaHCO_3$ is preferred. The concentration is preferably within the range of 1 wt % to 50 wt %, especially preferably 10 to 50 wt % with respect to the bone sample. The reaction time is 3 to 72 hours, preferably 10 to 72 hours. By controlling the salt concentration and/or the reaction time, the carbonate-group introduction rate can be controlled.

After the reaction, the sample is dried. The drying method is not limited, and the sample may be dried by sun drying or using a drier. By this, a material of about 5 to 10 cm in a bulk state can be obtained. When necessary, pulverization may be performed to prepare a powder of several ten to several hundred micrometers.

<Metal Adsorbent>

Since the carbonate apatite of the present invention has excellent adsorption capacity for metals, it can be used as a metal adsorbent. Examples of the metal include cadmium, strontium, cobalt, copper, lead, manganese, nickel, magnesium, mercury, arsenic, aluminum, tin, beryllium, and uranium. For example, by mixing the carbonate apatite of the present invention with a solution containing one or more kinds of metals, and performing incubation for a predetermined time, the metal(s) can be separated and removed from the solution by allowing adsorption of the metal(s). For example, the carbonate apatite of the present invention may be prepared as a powder and packed into a column, and the metal solution may be passed through the column to separate and remove the metal(s). The amount of the carbonate apatite used may be appropriately adjusted according to the type(s) and the concentration(s) of the metal(s)

EXAMPLES

The present invention is described below more concretely by way of Examples. However, embodiments of the present invention are not limited to the following Examples.

Example 1

(Preparation of Materials and Evaluation of Physical Properties)

Figure 2:
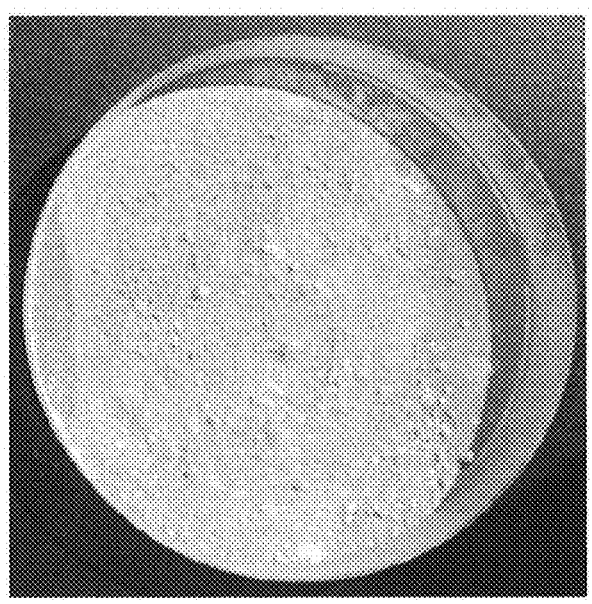
FIG. 2 shows a photograph of a bone sample powder obtained by basic carbonate compound treatment and drying treatment followed by pulverization.

Pig bone was heated at 130° C. at 2 atm for 3 hours. Detached bone marrow was removed (1$^{st}$ Step). Thereafter, 5 g (Sample 1), 0.5 g (Sample 2), 0.05 g (Sample 3), or 0.025 g (Sample 4) of NaHCO$_3$ was added to 2.5 g of the sample in 50 mL of pure water, and each resulting mixture was heated at 45° C. at atmospheric pressure for 48 hours (2$^{nd}$ Step). Thereafter, each mixture was washed with water, and then dried at 60° C. for 2 hours (FIG. 1). This sample was pulverized into a powder form (FIG. 2). The resulting powder was provided as a material according to the present invention, and subjected to the following evaluation. For comparison, a sample prepared by carrying out only the 1$^{st}$ Step followed by drying and pulverization (Sample α), and a commercially available hydroxyapatite were used.

Figure 3:
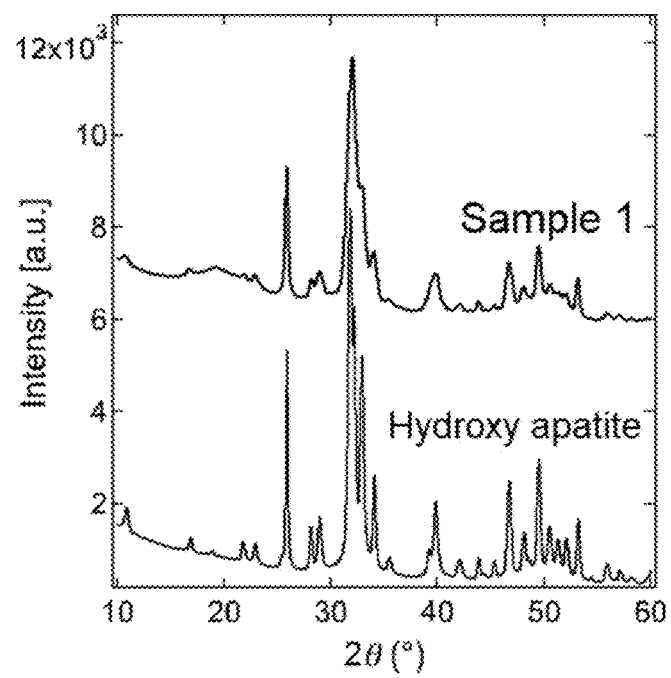
FIG. 3 shows an X-ray diffraction (XRD) pattern of a bone sample powder.
Figure 4:
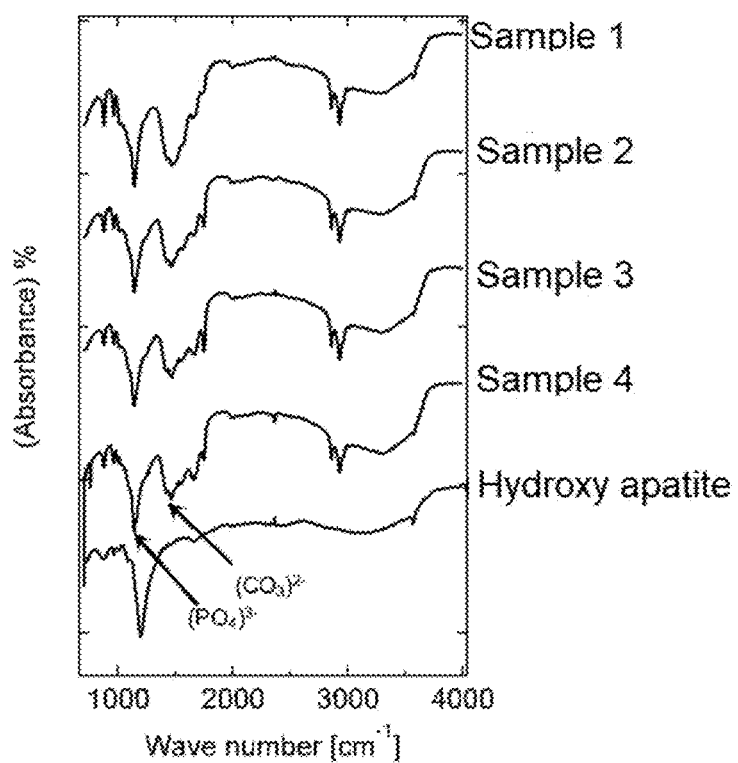
FIG. 4 shows infrared absorption (IR) spectra of bone sample powders.
Figure 5:
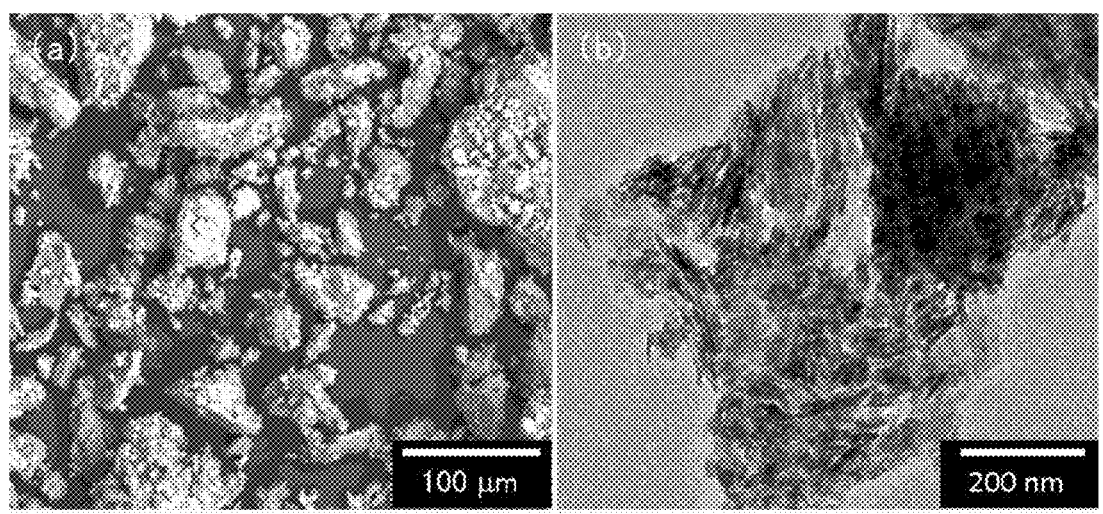
FIG. 5 shows photographs showing a scanning electron micrograph (SEM) (a) and a transmission electron micrograph (TEM) (b) of a bone sample powder.

By powder X-ray diffraction analysis, it was confirmed that the materials according to the present invention have a hexagonal (P6$_3$/m) crystal structure similarly to the commercially available hydroxyapatite compound (FIG. 3). Since a broad background appears due to an amorphous structure, the materials were found to have low crystallinity. According to results of measurement of the absorption spectrum by infrared absorption spectroscopy, the materials according to the present invention were found to contain a carbonate group, a phosphate group, and a hydroxyl group (FIG. 4). Further, according to X-ray fluorescence analysis, the materials were found to contain copper (Cu), zinc (Zn), strontium (Sr), magnesium (Mg), potassium (K), iron (Fe), and sodium (Na), as well as calcium (Ca) as the major component (Table 1). From these results, it was shown that the materials according to the present invention are carbonate apatite containing metal ions. Using a scanning electron microscope (SEM) and a transmission electron microscope (TEM), the materials according to the present invention were observed (FIG. 5). As a result, the crystallites were found to have sizes with a width of 5 to 12 nm, and a length of 20 to 85 nm.

TABLE 1

Metal species contained

| Element species | Content ratio (%) |
|---|---|
| Ca | 93.48 |
| Cu | 1.98 |
| Zn | 1.64 |
| Sr | 1.31 |
| K | 0.63 |
| Fe | 0.57 |
| Na | 0.31 |
| Mg | 0.08 |

(Evaluation of Strontium Adsorption Capacity)

Figure 6:
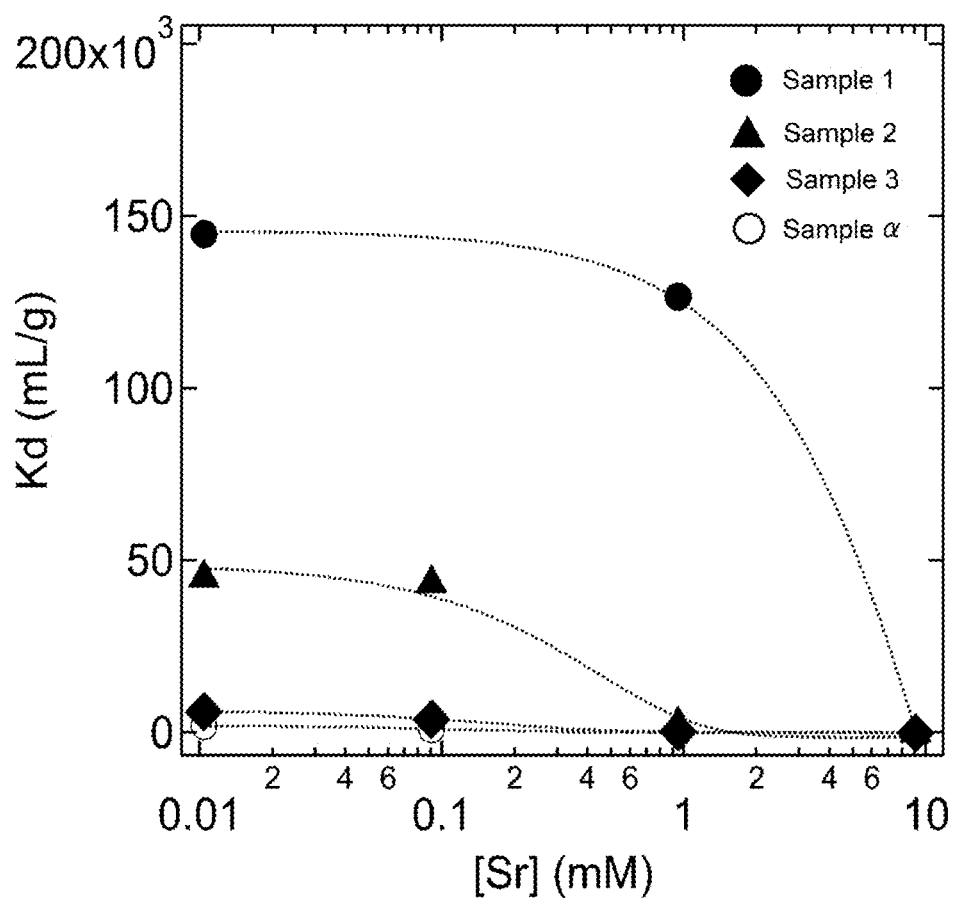
FIG. 6 shows a graph showing the partition coefficient (Kd) value of strontium adsorption in each sample.

For evaluation of the adsorption capacity of each material according to the present invention for strontium, 35 mg of the powder sample was weighed and taken, followed by adding 7 mL of a solution containing 0.01, 0.1, 1, or 10 mM strontium thereto, and then stirring the resulting mixture for 5 hours. The sample was separated from the solution using a filter, and the residual amount of strontium in the solution was measured by ICP-OES to calculate the adsorption ratio. The results are shown in FIG. 6. The materials according to the present invention showed high adsorption capacities. Further, as the amount of NaHCO$_3$ added in the 2$^{nd}$ Step increased, the amount of strontium adsorbed increased. Sample 1 showed a removal rate of 99.9% for 1 mM strontium solution, and the value of the partition coefficient (Kd) was 144,859 mL/g. This indicates a higher performance compared to conventional adsorption materials. The sample showed adsorption ratios of about 99.9% not only for strontium, but also for magnesium, nickel, cobalt, copper, lead, manganese, and cadmium. In particular, the sample tended to show selective adsorption of strontium, cobalt, and cadmium.

Figure 7:
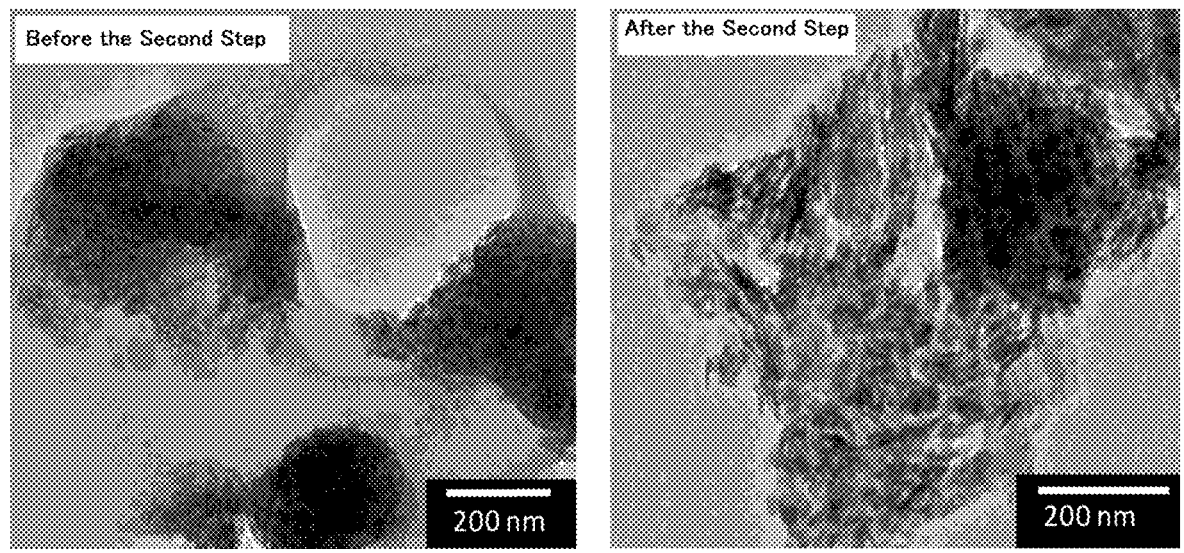
FIG. 7 shows photographs showing TEM images of bone sample powders obtained with basic carbonate compound treatment or without basic carbonate compound treatment.

In order to clarify the mechanism of improvement of the adsorption capacity caused by the addition of NaHCO$_3$, first, Sample α, to which no NaHCO$_3$ was added, was observed by transmission electron microscopy (FIG. 7). Unlike the cases where NaHCO$_3$ was added, crystallites showed aggregation, and they were found to be covered with thin films. The thin films are thought to be organic matter that was components of the bone. From this result, it is considered that the improvement of the adsorption capacity was achieved by contribution of the addition of NaHCO$_3$, which allowed removal of the organic matter encapsulating the apatite, leading to an increase in the contact area of the apatite for the subject ions. Thus, it was shown that, as the amount of NaHCO$_3$ added increases, the removal rate of organic matter increases.

Figure 8:
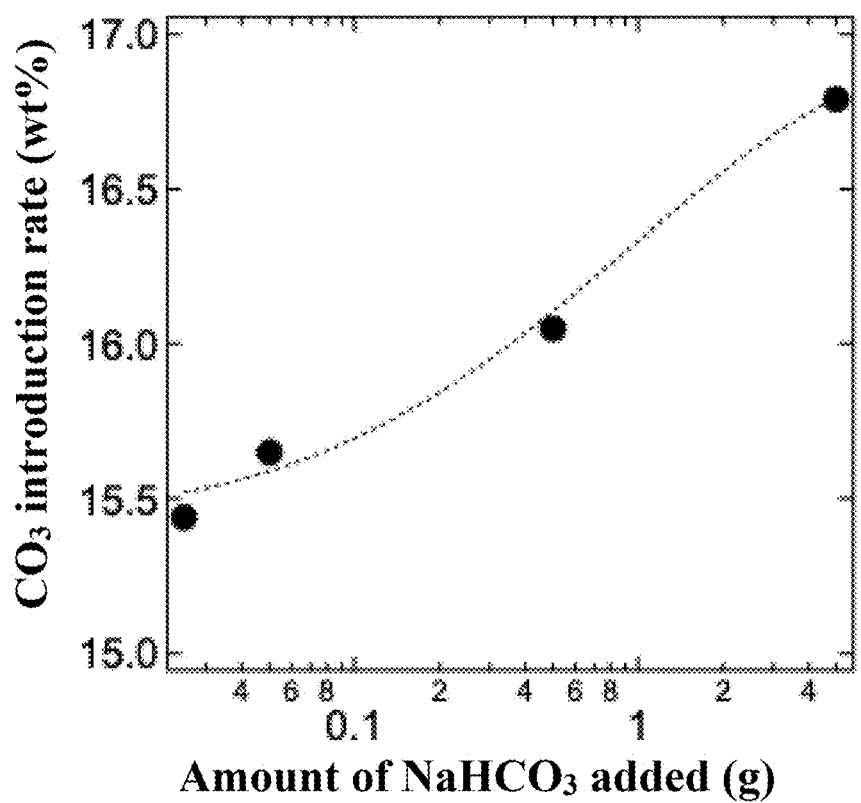
FIG. 8 shows a graph showing the relationship between the amount of sodium hydrogen carbonate added and the carbonate-group introduction rate.

The carbonate/phosphate intensity ratio was calculated from the absorption spectrum, and the amount of carbonate introduced was calculated from the peak ratio. According to a method reported in a known patent (calcium phosphate microparticles, JP 2005-126335 A), mass spectrometry of a known carbonate-containing artificial apatite was carried out. Based on the result, the correlation coefficient between the peak ratio and the amount of carbonate was determined for calculation. The Ca/P molar ratio was calculated by ICP emission spectrochemical analysis. The results are shown in Table 2 and FIG. 8. As the amount of NaHCO$_3$ added increased, the carbonate-group introduction rate increased. The samples showed extremely high carbonate introduction rates that could not be achieved by known production methods. This may be due to, for example, the fact that the contact area of the bone-derived apatite with the carbonate increased as a result of the removal of organic matter by the alkali metal, which happened at the same time as the introduction of carbonate. Each site occupied by the carbonate is any of a phosphate site, hydroxyl site, non-apatitic site, or surface adsorption site.

TABLE 2

| | Chemical composition | |
|---|---|---|
| Sample | Carbonate introduction rate (wt %) | Ca/P |
| 1 | 16.79 | 1.75 |
| 2 | 16.05 | 1.69 |
| 3 | 15.65 | 1.58 |
| 4 | 15.44 | — |
| α | 15.40 | — |

Each sample was subjected to zeta potential measurement using the electrophoretic light scattering method. The results are shown in Table 3. The zeta potential exhibited negative values as the carbonate-group introduction rate increased. This is due to slight changes in the composition and the crystal structure that occurred as a result of the introduction of carbonate groups. The negative charge is also a useful property for adsorption of cationic hazardous metals.

From these results, it was discovered that a material having high adsorption capacity for metal ions can be synthesized by increasing the amount of $NaHCO_3$ added, because of contribution of the following two factors: (1) efficient removal of organic matter from the bone, and (2) formation of stable adsorption sites by the introduction of carbonate groups.

TABLE 3

Zeta potentials of Samples
Zeta potentials (mV)

| Sample 1 | Sample 2 | Sample 3 | Sample α | Hydroxyapatite |
|---|---|---|---|---|
| −46.2 | −32.1 | −15.8 | −14.7 | −5.5 |

Figure 9:
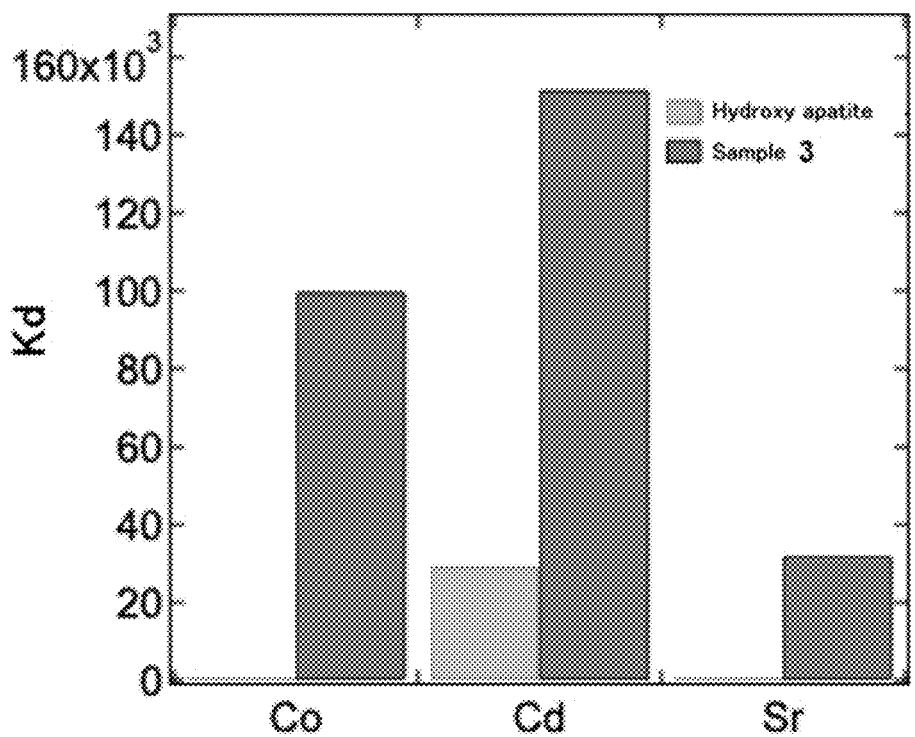
FIG. 9 is a graph showing metal ion selectivities of the adsorption capacity of a carbonate apatite material according to the present invention.

Further, for evaluation of ion selectivity, Sample 3 or a commercially available hydroxyapatite was added to an aqueous solution containing all of magnesium, nickel, cobalt, copper, lead, manganese, cadmium, and strontium, and then the apatite sample was removed. By measuring the metal ion concentration in the remaining solution by ICP-OES, the removal rate and Kd were determined. Table 4 shows the removal rate with Sample 3 for each element. FIG. 9 shows comparison of the Kd value with that of the hydroxyapatite. For example, while the ordinary hydroxyapatite exhibited a decrease in the strontium removal rate to about 40% in the presence of other ions, the material according to the present invention exhibited a removal rate of 99.9% even in the presence of other ions. As can be seen in FIG. 9, compared to the commercially available apatite, the sample of the present invention exhibited higher ion selectivities for cadmium, cobalt, and strontium.

TABLE 4

Element removal rates (ion selectivities) in mixed solution

| Element species | Removal rate (%) | | | | | | | |
|---|---|---|---|---|---|---|---|---|
| | Sr | Cd | Co | Pb | Mn | Ni | Cu | Mg |
| Sample 3 | 99.7 | 99.9 | 99.9 | 99.8 | 99.5 | 98.0 | 96.8 | 84.5 |

Example 2

(Preparation of Materials and Evaluation of Physical Properties)

Introduction of carbonate using various carbonic acid salts was evaluated. Pig bone was heated at 130° C. at 2 atm for 3 hours. Detached bone marrow was removed (1$^{st}$ Step). Thereafter, 5 g of ammonium carbonate $((NH_4)_2CO_3)$, sodium carbonate $(Na_2CO_3)$, or potassium hydrogen carbonate $(KHCO_3)$ was added to 2.5 g of the sample and 50 mL of pure water, and the resulting mixture was heated at 45° C. at atmospheric pressure for 48 hours (2$^{nd}$ Step). Thereafter, each mixture was washed with water, and then dried at 60° C. for 2 hours. This sample was pulverized into a powder form.

Figure 10:
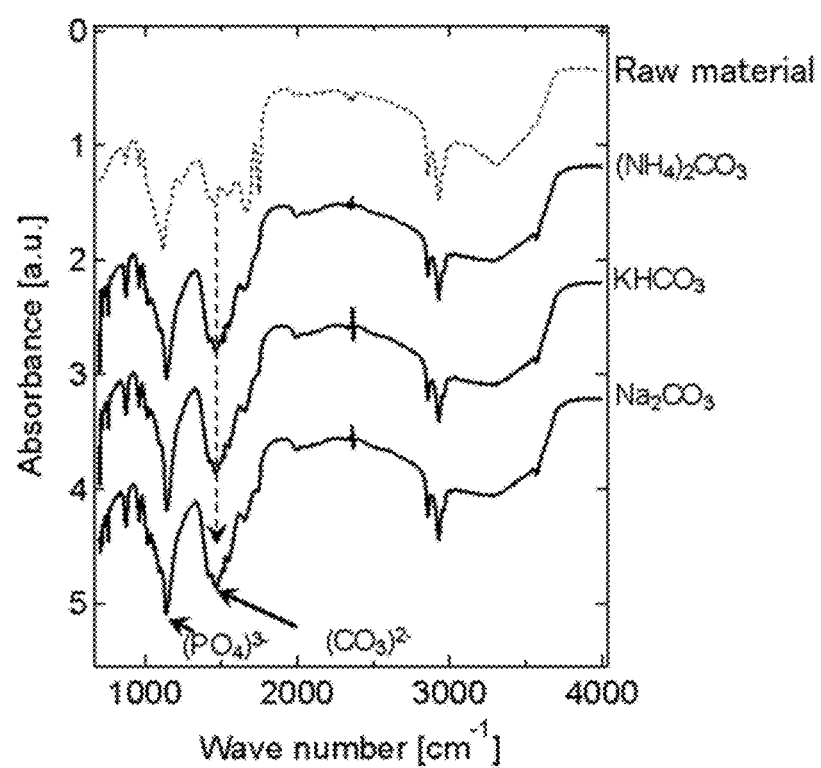
FIG. 10 is a graph showing carbonate group-introducing effects obtained with various carbonic acid salts.

According to results of measurement of the absorption spectrum by infrared absorption spectroscopy, the samples prepared with each carbonic acid salt showed increases in the intensity of the carbonate group peak, indicating successful introduction of carbonate (FIG. 10).

What is claimed is:

1. A carbonate apatite comprising not less than 15.6% by weight carbonate groups, wherein said carbonate apatite has a Ca/P molar ratio of not less than 1.5, and a zeta potential of not more than −15 mV, and wherein said carbonate apatite contains copper (Cu), zinc (Zn), strontium (Sr), magnesium (Mg), potassium (K), iron (Fe), and sodium (Na).

2. The carbonate apatite according to claim 1, comprising not less than 16.0% by weight carbonate groups.

3. The carbonate apatite according to claim 1, wherein said carbonate apatite contains a crystal structure having an average crystallite size of 1 to 100 nm.

4. The carbonate apatite according to claim 1, wherein said carbonate apatite is a bulk body of 5 to 10 cm.

5. The carbonate apatite according to claim 1, wherein said carbonate apatite is in a powder form having an average particle size of 10 μm to 500 μm.

6. The carbonate apatite according to claim 1, wherein said carbonate apatite is prepared from animal bone.

7. A method of adsorbing a metal comprising contacting a solution containing a metal with the carbonate apatite according to claim 1.

8. The method according to claim 7, wherein said metal is at least one metal selected from the group consisting of cadmium, strontium, cobalt, copper, lead, manganese, nickel, magnesium, mercury, arsenic, aluminum, tin, beryllium, and uranium.

* * * * *